Figure 1:
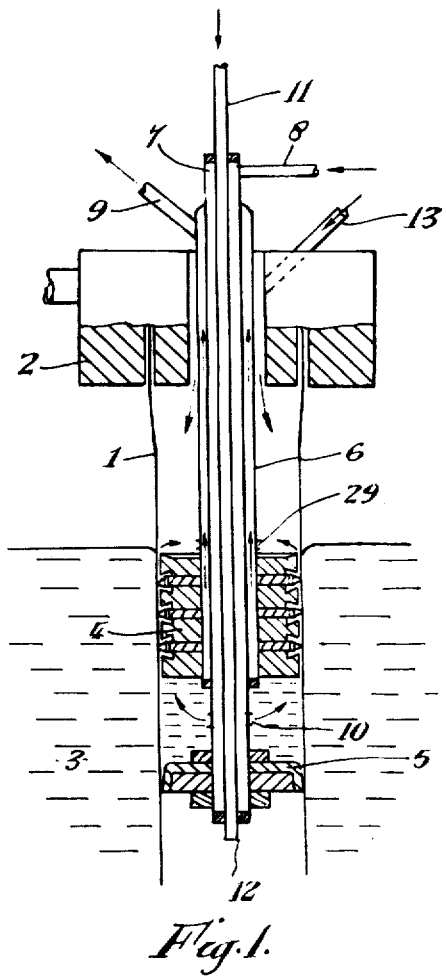

United States Patent [19]
Jack et al.

[11] 3,976,410
[45] Aug. 24, 1976

[54] EXTRUSION PROCESSES AND APPARATUS THEREFOR

[75] Inventors: James Jack, Mistley; Derek Cory Gray, Colchester, both of England

[73] Assignee: Bakelite Xylonite Limited, London, England

[22] Filed: Oct. 15, 1974

[21] Appl. No.: 514,802

[30] Foreign Application Priority Data
Oct. 15, 1973    United Kingdom............... 48048/73

[52] U.S. Cl.................................. 425/71; 264/95
[51] Int. Cl.²................... B29D 7/20; B29C 17/07
[58] Field of Search.................. 264/95; 425/67, 71, 425/378

[56] References Cited
UNITED STATES PATENTS

| | | | |
|---|---|---|---|
| 3,142,092 | 7/1964 | Ralston | 425/71 |
| 3,385,918 | 5/1968 | Jack et al. | 425/67 X |
| 3,468,995 | 9/1964 | Nelson | 425/71 X |
| 3,600,479 | 8/1971 | Yazawa et al. | 425/71 X |
| 3,819,776 | 6/1974 | Robinson et al. | 425/71 X |

FOREIGN PATENTS OR APPLICATIONS 1,106,994    3/1968    United Kingdom................. 264/95

*Primary Examiner*—Al Lawrence Smith
*Assistant Examiner*—James G. Smith
*Attorney, Agent, or Firm*—Brisebois & Kruger

[57] ABSTRACT

Apparatus for use in the production of a tube of organic thermoplastic polymeric material wherein the peripheral portions of the calibrating disc assembly and the seal that contact the wall of the tube comprises a liquid absorbent material; and a method of producing the above tube.

11 Claims, 3 Drawing Figures

EXTRUSION PROCESSES AND APPARATUS THEREFOR

This invention relates to apparatus for use in the production of quenched tubes of organic thermoplastics materials and is an improvement in or a modification of the invention described in commonly assigned patent application Ser. No. 323,422 Jack et al, filed Jan. 15, 1973, the disclosure of which is herein incorporated by reference.

Application Ser. No. 323,422 describes a process for internally cooling a continuously extruded tube of organic thermoplastics material which comprises extruding a tube downwardly from an extrusion die first over an assembly of at least two calibrating discs and then over a seal which is in circumferential contact with the inner surface of the tube, passing cooling liquid into the tube to maintain a column of continuously flowing liquid in the tube, the column having a lower level defined by the seal and an upper level which is above the top calibrating disc, the liquid entering the tube at a level below the bottom calibrating disc and passing through the assembly of calibrating discs to be withdrawn from the tube at a level above the top calibrating disc, the calibrating discs being so shaped and assembled as to prevent the formation of stagnant regions of liquid in the assembly, which process also comprises maintaining a gas pressure in the space bounded by the die, the inner surface of the tube and the surface of the liquid in the tube sufficient to prevent collapse of the tube as it leaves the die.

The prior application also describes apparatus for use in the process comprising an extrusion die for downwardly extruding a tube of organic thermoplastics material, an assembly of at least two calibrating discs which are disposed perpendicularly to the axis of the tube and which are mutually coaxial with each other as well as with the tube and which assembly is supported by a structure attached to and supported by the extrusion die, a seal associated with the die, means for passing liquid continuously into the interior of the thermoplastics tube at a level between the bottom calibrating disc and the seal, means for continuously extracting the liquid at a selected level above the top calibrating disc, and means for controlling the pressure of gas which lies in the space bounded by the die, the inner surface of tube and the liquid surface.

It has been found that when the process is used for the production of tubes from thermoplastics materials that do not contain such lubriceous additives as, for example, antistatic agents, slip agents and antiblock agents, especially electrical grade materials such as electrical grade polypropylene, the tube tends to be dragged very closely over the calibrating discs and seal so that considerable scratching of the inner surface of the tube may occur. When the tube is subsequently blown to form film the scratch marks become very noticeable and the film is useless for many applications where the appearance of the film and high electrical quality are important. In addition the scratches form weak points in the tube and this may cause a bubble blown in the tube to burst with the consequent hold up in production of film.

This invention provides an improved or modified apparatus of the type described in application Ser. No. 323,422 which enables the process to be used for the production of quenched tubes of thermoplastics polymeric material containing no lubriceous additives and also provides a process for the production of quenched tube using the apparatus. The process and apparatus can of course also be used for the production of tubes from material that does contain lubriceous additives.

According to application Ser. No. 323,422 the calibrating discs at their point of contact with the tube, are preferably as thin as is consistent with adequate support of the tube. The discs are preferably made from a metal or from a filled or unfilled fluorinated plastics material. The seal may be made of rubber but, especially when the tube is a polypropylene tube, is generally made of stainless steel.

This invention is based on the observation that scratching of the tube can be greatly reduced or eliminated if, instead of the metal or fluorinated plastics discs, discs are used of which at least the peripheral portions that contact the wall of the tube comprise a liquid-absorbent material and/or at least a part of at least the peripheral portion of the seal that contacts the wall of the tube comprises a liquid absorbent material.

The liquid-absorbent material may be, for example, a natural or synthetic open pore sponge material, for example, sponge rubber, polyurethane or polyvinyl chloride, porous leather, open pored sintered metals, cloth, for example, as layered pads or laminates, rope, string or cord, open pore minerals, for example, chalk, or paper or cardboard, but is preferably a felt. As examples of felts there may be mentioned RGP felt or Hardite felt (both supplied by Bury & Masco Industries Ltd, Bury, Lancs)

The discs and/or the seal may comprise a core of metal carrying a peripheral band of liquid absorbent material but preferably they comprise a disc of absorbent material supported on both sides by a rigid material. In those cases where the absorbent material is itself sufficiently rigid to at least substantially retain its shape while the tube is passed over the discs or the seal, it may be possible to dispense with rigid supports.

A preferred form of seal comprises one or more discs of a flexible, at least substantially non-absorbent material such as, for example, a closed cell foamed silicone rubber as supplied by James Walker of Woking, Surrey, followed by one or more discs of liquid-absorbent material in association with means for ensuring that quenching liquid does not bypass the seal. Thus, for example, the seal may comprise one or more discs of non-absorbent material, one or more separating discs, and one or more second discs of liquid-absorbent material together with suction means for withdrawing liquid from said second discs of liquid-absorbent material.

It is believed that the quench liquid saturates the absorbent material of the calibrating discs and provides a lubricating layer of liquid between the discs and the tube. The thickness of the absorbent material of the calibrating discs should be such as to ensure adequate support for the tube and adequate lubricating for the tube and this can easily be established for any given material by trial error.

It is believed that where at least a part of at least the peripheral portion of the seal that contacts the tube comprises a liquid-absorbent material that becomes saturated with quench liquid, the liquid provides a lubricating layer between that part of the seal and the tube. When the liquid-absorbent material is however kept substantially dry, for example by the application of suction, the material should be soft enough to ensure that minimal scratching of the tube occurs.

Figure 2:
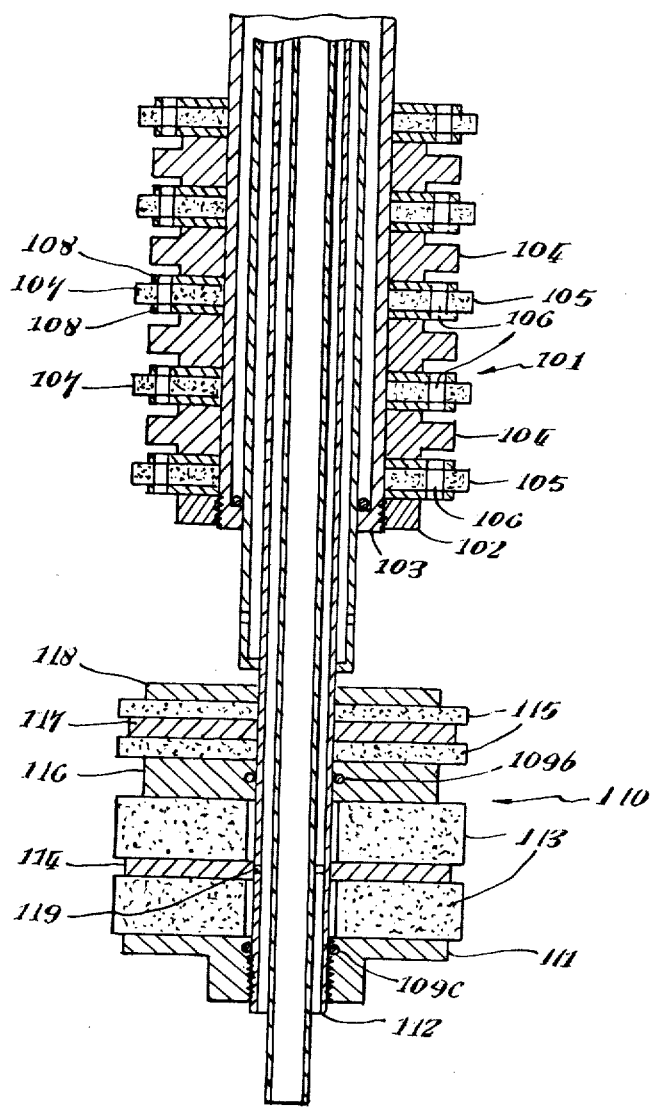
Figure 3:
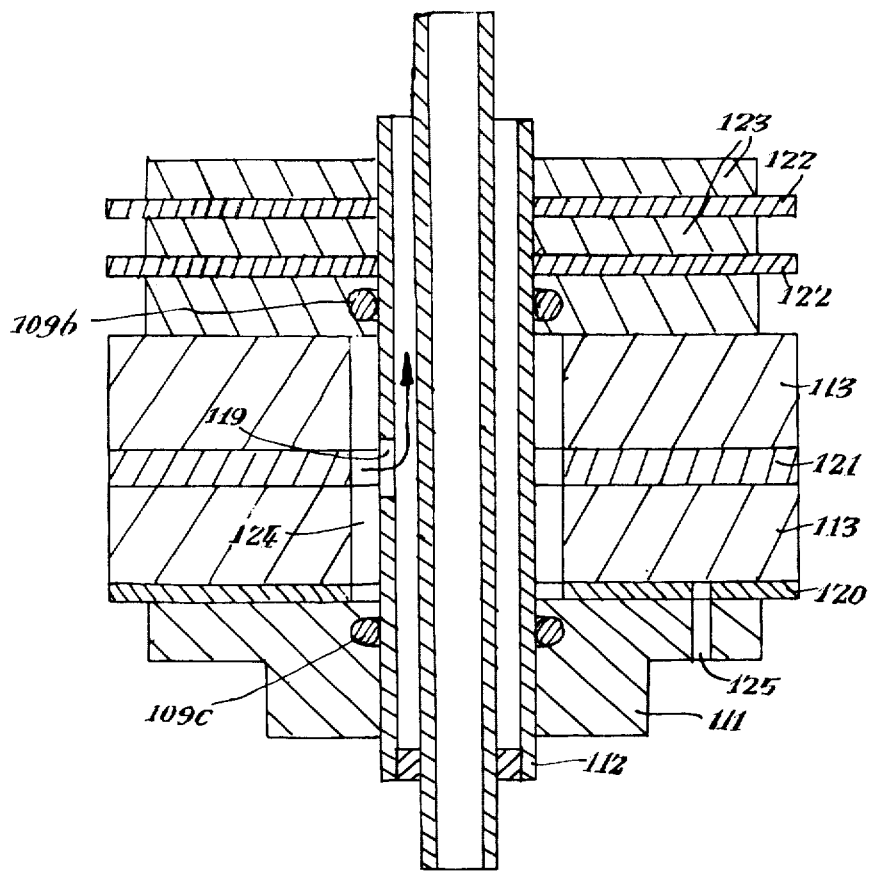

The invention will now be described in greater detail by way of example with reference to the accompanying drawings FIG. 1 of which shows one form of apparatus of the type described in application Ser. No. 323,422;

FIG. 2 shows a sectional view of an assembly of calibrating discs and a seal for use in an apparatus in accordance with this invention; and FIG. 3 shows an alternative form of seal.

With reference to FIG. 1, a tube 1 of the organic thermoplastics material is extruded from a die 2 which is fed by a suitable extrusion machine (not shown). The hot tube 1 proceeds vertically downwards into cooling liquid 3 contained in a cooling bath (not shown). The tube 1 passes downwards over an assembly 4 of calibrating discs after which it passes over a seal 5. The assembly 4 of calibrating discs is mounted on a tube 6 within which is coaxially fixed a second tube 7. Sealing means are provided to close, at each end of the tube 6, the annular region between the two tubes 6 and 7. The seal 5 is mounted on tube 7. A further tube 11 passes coaxially through tube 7 and the seal 5, and opens at a point 12 below the seal 5. The upper end of tube 11 can be connected to a source of gas at a suitable pressure.

The tubular assembly comprising tubes 6, 7 and 11 is mounted on the die 2 by means of locating spiders (not shown). A tube 13 passes through die 2. Gas can be introduced through tube 13 to provide a positive balance of pressure in the region of tube 1, bounded by the inner wall of tube 1, the die 2 and the surface of the cooling liquid in the tube 1. Any excess gas pressure is vented to atmosphere through the gap between tube 6 and die 2. The gas pressure within the space in tube 1 can be used to size and control the tube prior to its passing over the assembly of calibrating discs, 4.

Cooling liquid can be fed to tube 7 through tube 8. Cooling liquid passing down the annular region between tubes 7 and 11 emerges at the holes 10 which pierce the wall of tube 7 above the seal 5 and then rises in tube 1. This rising cooling liquid passes through and over the assembly 4 of calibrating discs via the holes 106 in the calibrating discs. The upper level of the resultant column of cooling liquid in the tube is set by the position of the holes 29, the pressure in the liquid and the force of the suction means applied to tube 9. The column of liquid in tube 1 is supported by the seal 5.

The flow of the cooling liquid is indicated by arrows in FIG. 1.

The assembly of calibrating discs indicated generally as 101 comprises a nut 102 in threaded engagement with tube 103. Tube 103 passes coaxially through an alternating sequence of baffle discs 104 and calibrating discs 105. The calibrating discs 105 have a number of holes 106 circumferentially disposed near their peripheries. The whole assembly is clamped together as described with reference to FIG. 2 of application Ser. No. 323,422 by a further baffle disc (not shown) which is screw-threaded onto tube 103 above the top calibrating disc. The calibrating discs 105 comprise a layer of felt 107 sandwiched between two aluminium plates 108. The tube 109 is in sealed engagement with tube 109 via O-ring 109a.

The seal indicated generally by 110 comprises a nut washer 111 screw-threaded onto tube 112, two discs 113 of liquid-absorbent material, separated by member 114, and two discs of flexible, at least substantially non-liquid-absorbent material 115, separated from the said discs 113 by a further separating member 116, and from each other by a separating member 117. The assembly is held together by a clamping piece 118 held in position on tube 112 by grub-screws (not shown). The tube 112 is drilled at 119 such that a vacuum can be applied to the discs 113 to withdraw any liquid by-passing the discs 115, the liquid being entrained in air drawn through the discs 113 from the portion of the tube below the seal. O-rings 109b and 109c serve to seal member 116 and nut washer 111 respectively to tube 112.

The remaining features of the apparatus and the operation of the process are as described in application Ser. No. 323,422.

The second form of seal shown in FIG. 3 which may replace the seal 110 in FIG. 2, comprises a nut washer 111 screw threaded onto tube 112, a first disc 120 of substantially non-absorbent foam silicone rubber, two discs 113 of RGP felt (a hard felt) separated by a disc 121 of Hardite felt (a soft felt) and two second discs 122 of substantially non-absorbent foam silicone rubber separated from each other and from the uppermost felt disc 113 by brass spacers 123. by-passing rubber discs 122 and the brass spacers 123 are a close fit on the tube 112. The whole assembly is glued together using Silastic 140 RTV adhesive (supplied by Dow Corning Corporation) which is believed to be a silicone rubber adhesive. The first rubber disc 120 and the felt discs 113 and 121 are mounted on tube 112 so that a space 124 is left between the inner surface of these discs and the tube 112. The tube 112 is drilled at 119 so that a vacuum can be applied to the space 124 to withdraw liquid by-passng the discs 122. In order that the vacuum drawn in the space 124 is not a hard vacuum, air bleed holes 125 are drilled in the nutwasher 111 and first rubber disc 120. O-rings 109b and 109c serve to seal the lower most spacer 123 and the nut washer 111, respectively to tube 112.

The seal 110 of either FIG. 2 or FIG. 3 may be used with the conventional calibrating disc assembly described in application Ser. No. 323,422 or as shown in the drawings be used with the modified calibrating disc assembly of this invention. Alternatively the seal of application Ser. No. 323,422 may be used with the modified calibrating disc assembly of this invention.

The following Examples illustrate the invention.

EXAMPLE 1

A tube of polypropylene resin (Grade PXC 3391 as manufactured and sold by ICI Ltd) was extruded from a 2-inch diameter annular extrusion die fed by a 3-inch diameter extruder operating at an output of approximately 50 lb/hr. The temperature of the tube leaving the die was approximately 200°C. The extruded tube was quenched employing apparatus as described herein with specific reference to FIG. 2 of the drawings but using the alternative seal show in FIG. 3 the remaining features of the apparatus and the operation thereof were generally as described in application Ser. No. 323,422 with the following conditions prevailing:

The calibrating discs each comprised 1.85-inch diameter discs of R.G.P. felt of thickness ⅛-inch supported on each side by aluminium discs of diameter 1.6-inch and thickness 1/32-inch adhered thereto by means of Silastic 140 RTV (an adhesive supplied by Dow Corning Corporation and believed to be based on silicone rubber). The aluminium discs and felt were provided with concentric ⅛-inch holes at a spacing of ¼-inch centres which centres were spaced 3/32-inch inside the edges of the aluminium discs. Five of these composite calibrating discs were collated in alternating fashion as shown with 1.6-inch dia brass baffle discs each of thickness ¼-inch and having a peripheral 3/16-inch rebate on each side leaving a ⅛-inch thick peripheral portion. The collation of alternate calibrating discs and baffle discs were clamped together on the centre tubular assembly between a brass threaded baffle disc surmounting the above described collation and a brass nut washer. The threaded baffle disc was shaped to have a flat side to contact the upper-most calibrating disc and upward facing side comprising a centre portion parallel to the opposite side and a peripheral inclined portion such that over this portion the disc increased in thickness constantly towards the peripheral edge, thus providing a weir. The diameter of the threaded baffle disc was equal to that of the other baffle discs and the peripheral weir portion was of width ¼-inch the minimum thickness being ⅛-inch and the maximum thickness being ¼-inch.

Details of the seal:-

| | |
|---|---|
| Diameter of felt discs | 1.9-inch |
| Thickness of RGP felt discs each | 1/4-inch |
| Thickness of Hardite felt disc | 1/4-inch |
| Diameter of foamed silicone rubber (supplied by James Walker) discs | 1.9-inch |
| Thickness " | 1/8-inch |
| Diameter of centre holes in felt discs | 5/8-inch |
| Outside diameter of centre tube assembly | 1/2-inch |
| Diameter of brass spacers | 1.65-inch |
| Thickness of brass spacer and nut washer (less boss) with o-ring inserts | 3/16-inch |
| Thickness of brass spacers without o-ring inserts | 1/8-inch |

The component discs of the seal were adhered to one another employing Silastic 140 RTV.

The air bleed holes in the nut washer and bottom rubber disc were of diameter ⅛-inch the centres of which were spaced from one another by ¼-inch and from the edge of the discs by 3/32 inch.

| | |
|---|---|
| Internal quench liquid | water |
| Internal quench liquid temperature | 10°C |
| Internal quench liquid flow-rate, through and over calibrating discs | 3–4 gals/min |
| External quench liquid | water |
| External quench liquid temperature | 10°C |
| Tube speed | 21 ft/min. |
| Quenched tube wall thickness (nominal) | 0.010-inch. |

The start-up procedure to establish the quenched tube was similar to that described in Example 1 of application Ser. No. 323,422 With suction applied to the seal the above conditions were maintained and a continuous process established. The quenched tube, the inner surface of which was substantially dry after passage over the seal, was substantially free of surfce scratches. When the quenched tube was subjected to a conventional bubble blowing process and thus converted into a balanced biaxially orientated film of nominal thickness 0.3 mil, it was found that the bubble-blowing process could be sustained for very long periods without rupture of the bubble and consequent interruption of production occurring, further, the film product had a very high gloss and clarity and was completely free from visible scratches.

EXAMPLE 2

Example 1 was repeated except that the aluminium-disc-suppoted - felt calibrating discs were replaced by similarly shaped and drilled solid brass calibrating discs but having their peripheries bevelled to provide a minimum of contact area with the extruded tube wall. The quenched tube obtained was observed to bear some surface scratches caused by its passage over the calibrating disc assembly, but no additional scratches were introduced by the seal. Further, notwithstanding the scratched tube wall the seal was effective in retaining the column of quench liquid in the quenched tube and in ensuring that the inner surface of the tube, after its passage over the seal, was substantially dry. When the quenched tube thus produced was subjected to a conventional bubble blowing process (blown film process) and converted to film of nominal thickness 0.3 mil, the product, although not of such high quality as that produced in Example 1, was superior to the product obtainable from quenched tube produced employing the above described brass calibrating disc assembly with the double-flexible seal arrangement of FIG. 3 of application Ser. No. 323,422 in that fewer scratches were evident in the film. Further, in operating the blown-bubble process to produce the films, fewer interruptions were experienced when employing the quenched tube obtained employing the novel seal of this invention as compared with that obtained employing the seal as formerly described in application Ser. No. 323,422, with reference to FIG. 3 of that Application, and made of substantially non-absorbent rubber.

EXAMPLE 3

Example 1 was repeated except that the seal was replaced by a double flexible seal of the type illustrated in FIG. 3 of application Ser. No. 323,422 made of substantially non-absorbent rubber and fitted with suction means. The quenched tube obtained was observed to have fewer scratches than that quenched tube obtained for comparison by employing a calibraing disc assembly and seal, according to application Ser. No. 323,422 and comprising the brass calibrating disc assembly described in Example 2 with the double flexible seal as used in this Example, under similar conditions. That fewer scratches were present was shown by the fact that when the quenched tube of this Example was subjected to a conventional bubble-blowing process and converted to film of nominal thickness 0.3 mil, continuous running of the process could be sustained for longer periods without rupture of the bubble. Further, although the film product obtained was not of such high quality as that produced in Examples 1 or 2 it had fewer visible scratches than that obtainable from the quenched tube produced for comparison.

We claim:

1. In an apparatus for use in the production of a quenched tube of organic thermoplastics polymeric material, comprising an extrusion die for downwardly extruding a tube of organic thermoplastics material, a first component consisting of an assembly of at least two calibrating discs which are disposed perpendicularly to the axis of the tube and which are mutually coaxial with each other as well as with the tube and which assembly is supported by a structure attached to and supported by the extrusion die, a second component consisting of a seal supported by the die, means for passing liquid continuously into the interior of the thermoplastics tube at a level between the bottom calibrating disc and the seal, means for continuously extracting the liquid at a selected level above the top calibrating disc, and means for controlling the pressure of gas which lies in the space bounded by the die, the inner surface of the tube and the liquid surface, the improvement whereby at least a part of at least those peripheral portions of said components, which during operation contact the inner wall of the tube are made of a liquid absorbent material.

2. Apparatus as claimed in claim 1, wherein the peripheral portions of the calibrating discs that will, in use, contact the wall of the tube comprises liquid absorbent material.

3. Apparatus as claimed in claim 1, wherein at least some part of the peripheral portion of the seal, that will, in use, contact the wall of the tube comprises liquid absorbent material.

4. Apparatus as claimed in claim 1, wherein both the calibrating discs and at least some part of the seal have peripheral portions that, in use, contact the wall of the tube and comprise liquid absorbent material.

5. Apparatus as claimed in claim 1, wherein the liquid absorbent material is an open pore sponge material, an open pore sintered metal, porous leather, cloth, rope, string or cord, an open pore mineral or paper or cardboard.

6. Apparatus as claimed in claim 1, wherein the liquid absorbent material is a felt.

7. Apparatus as claimed in claim 1, wherein the calibrating discs comprise a rigid central portion surrounded by a peripheral band of liquid absorbent material.

8. Apparatus as claimed in claim 1, wherein the calibrating discs comprise a disc of liquid absorbent material supported on both sides by a rigid material.

9. Apparatus as claimed in claim 1, wherein at least a part of at least the peripheral portion of the seal that contacts the wall of the tube comprises the liquid absorbent material and there is provided means for wiping the surface of the tube after it has passed the liquid absorbent material to remove any residual quenching liquid remaining on the surface of the tube.

10. Apparatus as claimed in claim 9 wherein the wiping means comprises a disc of substantially non-absorbent foam silicone rubber or the like.

11. In a process for quenching a continuously extruded tube of organic thermoplastics polymeric material which comprises the steps of leading the tube from the die of an extrusion machine vertically downward around a first component consisting of an assembly of a plurality of calibrating discs which are positioned coaxially of said tube and perpendicular to the axis thereof, the calibrating discs being so shaped and assembled as to prevent the formation of stagnant regions of liquid in the assembly, and then over a second component consisting of a seal which is in circumferential contact with the inner surface of said tube and positioned coaxially of said tube while bathing the inner surface of said tube with a quenching liquid which is circulated through said tube by first forming a body of liquid in contact with said inner surface beneath said assembly, said body of liquid having a lower level defined by the seal, causing the liquid in said body to rise in a continuous column within said tube to a selected level lying above the top of said assembly while remaining in contact with said inner surface between the discs of said assembly and at said selected level above said assembly, and withdrawing said liquid upwardly from a point above said assembly by suction means which maintains said liquid at said selected level, and maintaining a gas pressure in the space bounded by the said die, the inner surface of said tube and the surface of the liquid sufficient to prevent collapse of said tube as it leaves said die, the improvement which comprises the step of forming a lubricating layer of quenching liquid between the periphery of each disc and the wall of the tube by causing said liquid to saturate at least the peripheral portions of at least one of said components, which portion, during operation, contacts the inner wall of the tube and comprises a liquid absorbent material.

* * * * *